United States Patent
Wüst et al.

(10) Patent No.: US 12,492,658 B2
(45) Date of Patent: Dec. 9, 2025

(54) SYSTEM AND METHOD FOR MONITORING AN EXHAUST GAS PURIFICATION SYSTEM

(71) Applicant: SICK AG, Waldkirch (DE)

(72) Inventors: Jochen Wüst, Waldkirch (DE); Andreas Hengstenberg, Reinfeld (DE); Hinrich Brumm, Ellerbek (DE); Paul Schindler, Freiburg (DE); Diana Lopez Cardenas, Hamburg (DE); Julian Blaschtschak, Hamburg (DE)

(73) Assignee: SICK AG, Waldkirch (DE)

( * ) Notice: Subject to any disclaimer, the term of this patent is extended or adjusted under 35 U.S.C. 154(b) by 2 days.

(21) Appl. No.: 18/216,067

(22) Filed: Jun. 29, 2023

(65) Prior Publication Data

US 2024/0003285 A1 Jan. 4, 2024

(30) Foreign Application Priority Data

Jun. 30, 2022 (DE) .......................... 102022116382.2

(51) Int. Cl.
*F01N 11/00* (2006.01)

(52) U.S. Cl.
CPC ........ *F01N 11/002* (2013.01); *F01N 2560/14* (2013.01); *F01N 2590/02* (2013.01);
(Continued)

(58) Field of Classification Search
CPC ............... F01N 11/002; F01N 2560/14; F01N 2590/02; F01N 2900/0416;
(Continued)

(56) References Cited

U.S. PATENT DOCUMENTS

| | | | | | |
|---|---|---|---|---|---|
| 4,171,637 | A | * | 10/1979 | Blanke ................ | G01M 15/102 702/182 |
| 5,941,918 | A | * | 8/1999 | Blosser .................. | F01N 11/00 701/33.9 |

(Continued)

FOREIGN PATENT DOCUMENTS

| EP | 2955345 A1 | 12/2015 |
|---|---|---|
| EP | 3012010 B1 | 3/2017 |

(Continued)

OTHER PUBLICATIONS

Search Report dated Sep. 22, 2023 issued in corresponding European Application No. 23181183.7.

(Continued)

*Primary Examiner* — Matthew T Largi
(74) *Attorney, Agent, or Firm* — Nath, Goldberg & Meyer; Jerald L. Meyer

(57) ABSTRACT

A system and a method are provided for monitoring an exhaust gas purification system that is functionally connected to an emission source. An emission sensor acquires an emission signal that indicates emissions of the emission source on the exiting from the exhaust gas purification system. In addition, measurement signals that are each related to the exhaust gas purification system are acquired by a plurality of further sensors. A process state of the exhaust gas purification system is determined based on the measurement signals of the further sensors. Then, the emission signal and the process state are assessed with respect to an anomaly in each case. A compliant emission state, which indicates a correct functionality of the exhaust gas purification system, is determined and output when no anomaly of the emission signal is present or when an anomaly of the emission signal is present while at the same time no anomaly of the process (Continued)

state is determined or the anomaly of the emission signal satisfies an exception condition.

9 Claims, 2 Drawing Sheets

(52) U.S. Cl.
CPC ............... *F01N 2900/0416* (2013.01); *F01N 2900/0422* (2013.01); *F01N 2900/1602* (2013.01)

(58) Field of Classification Search
CPC ..... F01N 2900/0422; F01N 2900/1602; F01N 2560/02; F01N 2900/06; F01N 2900/1402; F01N 2900/16; F01N 11/00; F01N 2550/00; F01N 2560/022; F01N 2560/024; F01N 2560/027
See application file for complete search history.

(56) References Cited

U.S. PATENT DOCUMENTS

| | | | | |
|---|---|---|---|---|
| 10,914,221 | B2* | 2/2021 | Hasslacher | F01N 11/00 |
| 2003/0216855 | A1* | 11/2003 | Liang | F01N 13/0097 |
| | | | | 701/114 |
| 2004/0045278 | A1* | 3/2004 | Pott | F02D 41/1453 |
| | | | | 60/285 |
| 2008/0154671 | A1* | 6/2008 | Delk | G01N 33/0075 |
| 2012/0018671 | A1* | 1/2012 | Plant | C09K 3/32 |
| | | | | 252/184 |
| 2012/0239308 | A1* | 9/2012 | Miller | G01N 1/2252 |
| | | | | 702/24 |
| 2015/0013442 | A1* | 1/2015 | Michalske | F02D 41/1454 |
| | | | | 73/114.71 |
| 2016/0047718 | A1* | 2/2016 | Uratani | F01N 13/008 |
| | | | | 73/114.71 |
| 2017/0296963 | A1* | 10/2017 | Richardson | B01D 53/1493 |
| 2018/0037308 | A1* | 2/2018 | Lee | C02F 1/008 |
| 2019/0120113 | A1* | 4/2019 | Muthukaruppan | F01N 3/2066 |
| 2019/0234348 | A1* | 8/2019 | Johnson | F01N 5/02 |
| 2020/0061527 | A1* | 2/2020 | Gong | B01D 53/56 |
| 2024/0289573 | A1* | 8/2024 | Ruf | G06K 7/12 |

FOREIGN PATENT DOCUMENTS

| | | |
|---|---|---|
| KR | 1020210155464 A | 12/2021 |
| KR | 1020220074123 A | 6/2022 |

OTHER PUBLICATIONS

Annex 1, Resolution MEPC.259(68) (adopted on May 15, 2015): Guidelines for exhaust gas cleaning systems; im Internet heruntergeladen am Feb. 1, 2023 unter https://wwwcdn.imo.org/localresources/en/OurWork/Environment/Documents/MEPC.259(68).pdf.

Campara, Leo & Hasanspahić, Nermin & Vujicic, Srdjan. (2018). Overview of Marpol Annex VI regulations for prevention of air pollution from marine diesel engines. SHS Web of Conferences. 58. 01004. 10.1051/shsconf/20185801004.; im Internet heruntergeladen am Feb. 1, 2023 unter https://www.researchgate.net/publication/329383051_Overview_of_MARPOL_ANNEX_VI_regulations_for_prevention_of_air_pollution_from_marine_diesel_engines.

Official Letter dated Feb. 2, 2023 issued in corresponding German Application No. 10 2022 116 382.2.

* cited by examiner

SYSTEM AND METHOD FOR MONITORING AN EXHAUST GAS PURIFICATION SYSTEM

FIELD

The invention relates to a system and a method for monitoring the functionality of an exhaust gas purification system that is connected to an emission source, in particular to a ship's engine.

BACKGROUND

In accordance with the MARPOL Convention (International Convention for the Prevention of Marine Pollution from Ships) and in accordance with other local guidelines, ships must nowadays demonstrate compliance with required emission limit values. This can take place through the use of exhaust gas purification systems, which e.g. comprise so-called "scrubbers", wherein emitted emissions are documented by emission measurement devices. Alternatively, high-quality and thus expensive fuel can be used during the operation of the ship and its use can be proven.

If the exhaust gas purification system and/or the emission measurement devices is/are not available or not ready for operation, a manual documentation and a subsequent assessment by a skilled person often have to take place. However, in the event of a failure of an exhaust gas purification system and/or of emission measurement devices, the documentation vis-n-vis third parties, i.e. vis-à-vis a flag state during a ship's voyage, is either very complex and associated with increased costs or, in extreme cases, not feasible. Furthermore, a repair of exhaust gas purification systems and/or emission measurement devices by an appropriate specialist during a journey is rarely possible or not at all. A time period without proof of the correct functionality of the exhaust gas purification systems generally increases the cost risk for the corresponding ship transport since, for example, penalties can be incurred or a particularly clean fuel must be used.

To reduce difficulties due to the lack of verification of the emissions from exhaust gas purification systems, redundant emission measurement devices can be used. However, they require correspondingly higher acquisition and operating costs.

Proof of a correct mode of operation of the exhaust gas purification system of a ship often depends on the measurement values of a single sensor, for example, of an exhaust gas sensor at the outlet of a scrubber. If such an exhaust gas sensor fails or provides faulty measurement values, the operation of the exhaust gas purification system is consequently considered faulty. In a port near the current position of the ship, a repair of the exhaust gas sensor is then usually performed as soon as possible.

However, it is possible that even if the exhaust gas sensor fails, the exhaust gas purification system will continue to operate correctly and its emission values will remain below predefined limit values. If such an operation with low emission values could, for example, be demonstrated despite a failure or faulty measurement values of the exhaust gas sensor, a smoother operation of the exhaust gas purification system and thus of the entire ship could take place.

SUMMARY

An object of the invention is to provide a method and a system by which a correct operation of an exhaust gas purification system is ensured even in the event of a malfunction of one of its sensors.

This object is satisfied by a system and a method having the features of the independent claims. Advantageous further developments of the invention are set forth in the dependent claims, in the description, and in the drawings.

The system is provided for monitoring an exhaust gas purification system that is functionally connected to an emission source that is in particular a ship's engine. The system comprises an emission sensor that acquires an emission signal that indicates emissions of the emission source on the exiting from the exhaust gas purification system, a plurality of further sensors that output respective measurement signals related to the exhaust gas purification system, and an electronic processing unit. The processing unit is configured to determine a process state of the exhaust gas purification system based on the measurement signals of the further sensors in order to assess the emission signal and the process state with respect to an anomaly in each case. The processing unit is further configured to determine and to output a compliant emission state of the exhaust gas purification system when no anomaly of the emission signal is present or (i.e. then) when an anomaly of the emission signal is present while at the same time no anomaly of the process state is present in determined form or the anomaly of the emission signal satisfies an exception condition.

The exhaust gas purification system is, for example, installed in or on a ship and can therefore comprise a so-called scrubber for purifying exhaust gas of a ship's engine. A first type of such a scrubber, which is also called a wet scrubber, uses washing water that is usually taken from the ocean or another body of water and conducted through the scrubber for exhaust gas purification. Alternatively, dry scrubbers, in which a lime granulate is used instead of the washing water, can be used for exhaust gas purification on ships. Furthermore, so-called Denox scrubbers are, for example, also used for exhaust gas purification on ships. The term "Denox" refers to the removal of nitrogen oxides (NOx) from the exhaust gas of the ship's engine. In a Denox scrubber, the removal of nitrogen oxides can take place in a similar manner as for exhaust gases from motor vehicles that use a catalytic converter.

A plurality of different substances can usually be removed from the exhaust gas of the ship's engine by means of a scrubber. For example, the aforementioned wet and dry scrubbers are indeed primarily provided for removing sulfur, but they are also suitable for soot and nitrogen oxides. Conversely, depending on its design, a Denox scrubber can remove further substances from the exhaust gas, for example sulfur and soot, in addition to nitrogen oxides.

The emission sensor detects the emissions in the exhaust gas after the purification by means of the exhaust gas purification system. In addition, there are the further sensors that are related to the exhaust gas purification system and are thus related to the emission state. In the case of a wet scrubber, the further sensors, for example, record the pH value of the washing water and/or process parameters of the scrubber and of the ship's engine. In the case of dry and Denox scrubbers, process parameters of the respective scrubber can be detected in a similar manner by means of the further sensors that are provided in addition to the emission sensor. The further sensors can detect the state of a respective medium that is used for purifying the exhaust gas in the respective scrubber type.

The emissions of the emission source, for example of the ship's engine, can be defined by a mass and/or volume concentration, a quantity, or a mass of one or more gases that are measured after the purification by means of the exhaust gas purification system. The emissions are, for example, represented by the $SO_2$ concentration and/or the $CO_2$ concentration in the exhaust gas in ppm or percentage by volume.

If the exhaust gas purification system is installed in a ship, it comprises a device for treating the water that is conducted through the scrubber so that the water can then be returned to the sea or body of water again. In this case, some of the further sensors can be installed at or in the device for treating the water in order, for example, to detect its temperature or water flow rate. Furthermore, the further sensors can also comprise a sensor that indicates the condition of the water after the treatment and before the return to the sea or body of water.

Furthermore, the further sensors can comprise those sensors that are indirectly related to the exhaust gas purification system and that are, for example, installed at or in components of a ship that define the exhaust gas quantity that is received from the exhaust gas purification system. Such further sensors can be, for example, a sensor for the engine power and/or further parameters of the ship's engine and sensors that detect the speed and the acceleration of the ship.

The measurement signals of the further sensors can each define a process parameter that corresponds to the measurement variable that is represented by the respective measurement signal. The totality of these process parameters can describe the process state of the exhaust gas purification system, i.e. similar to components of a vector that represents the process state. The anomaly of the emission signal and of the process state can in each case be determined by comparing the emission signal and the measurement signals of the further sensors with respective validity criteria. If the emission signal or one of the measurement signals of the further sensors does not meet the respective validity criterion, an anomaly of the emission signal or of the process state can be present. For example, an anomaly of the emission signal can be present if it is above a legally predefined limit value. The anomaly of the emission signal can further comprise determining that the emission sensor has failed or outputs a meaningless or dubious value. In this case, the process state is assessed to be able to determine whether, despite the anomaly of the emission sensor, a correct functionality of the exhaust gas purification system and a compliant emission state are present.

In the simplest case, the determination and the output of the compliant emission state can comprise merely stating that the current emission quantity of the exhaust gas purification system is below a legally prescribed limit value. Alternatively or additionally, a determined emission quantity such as sulfur can, however, be quantitatively specified. The term "compliant" in connection with the emission state refers to the fact that the determined emission quantity complies with legal specifications and is, for example, below the limit value that is predefined in a flag state in each case.

An advantage of the system and the method described below is that the emission state of the exhaust gas purification system can be determined and output even when an anomaly of the emission signal is present, for example, if the emission sensor fails or in the case of a faulty emission signal. The time period during which a correct function of the exhaust gas purification system can be verified can thereby be maximized.

Thus, the operation of the exhaust gas purification system can be continued even when an anomaly of the emission signal or of the emission sensor is present and this anomaly can be compensated by means of the measurement signals of the further sensors when determining the compliant emission state. As a result, undesired operating interruptions, for example during a ship's voyage, can be avoided by the system or by the application of the method as long as the process state allows the determination of the compliant emission state, for example based on the measurement signals of the further sensors.

This leads to an improved information state about the correct function of the exhaust gas purification system. Additional costs that occur in connection with disturbances of the exhaust gas purification system can thus be reduced since, for example, the frequency of manual documentation of the emission state is reduced and redundant emission devices are not required. Overall, the reliability for the detection of the emission state of the exhaust gas purification system is improved by means of the method. Furthermore, the use of expensive fuel for operating ships is not absolutely necessary. Since the process state of the exhaust gas purification system is determined based on the measurement signals of the plurality of further sensors, malfunctions of the exhaust gas purification system can further be recognized at an early stage and can, for example, be reported by means of a warning system.

In accordance with one embodiment, the exception condition can comprise that the emission signal deviates for less than a predetermined time period from a normal state that is defined by a validity criterion for the emission signal acquired by the emission sensor. Due to the time limitation of the exception condition, the quantity of unwanted emissions can be reduced that are indeed tolerated in many cases by legislators for such an exception condition, but that nevertheless present a burden on the environment.

The determination of the respective validity criterion, i.e. for the emission signal and for the aforementioned signals of the further sensors that define the process state, can take place directly or indirectly based on one or more validity criteria for the measurement signals of the emission sensor and the other sensors. The validity criteria can, for example, comprise a lower and an upper limit value for the respective measurement signal.

When an anomaly of the process state is determined and the anomaly of the emission signal does not satisfy the exception condition, the electronic processing unit can output a specific error message. The output of the specific error message enables an early recognition of malfunctions of the exhaust gas purification system.

In accordance with a further embodiment, the electronic processing unit calculates a substitute signal for the emission signal based on the measurement signals of the further sensors when an anomaly of the emission signal is present and no anomaly of the process state is determined. The electronic processing unit can further determine the compliant emission state based on the substitute signal when an anomaly of the emission signal is present while no anomaly of the process state is determined. Otherwise, i.e. if no anomaly of the emission signal is determined, the emission state is determined based on the emission signal.

Based on the substitute signal, the compliant emission state of the exhaust gas purification system can thus also be determined when an anomaly of the emission signal is present, for example, when the emission sensor fails. In the event of such a failure of the emission sensor or of another anomaly of the emission signal or emission sensor, a correct function of the exhaust gas purification system with emissions below permissible limit values can thus be verified by means of the substitute signal. If the exhaust gas purification system is installed in a ship, a ship's voyage can therefore be continued without interruption up to a planned port of destination even if the emission sensor fails. Expenses due to unscheduled port calls can thereby be avoided again.

The determination of the substitute signal based on the measurement signals of the further sensors can take place by a prediction method in which, for example, an algorithm of machine learning is used that can be realized by a regression model, e.g. by a neural network. The learning phase of such a neural network can, for example, be performed during the correct operation of the emission sensor in which a compliant emission state is present. When using such a neural network, a calculation model can further be used that links the process state of the exhaust gas purification system and the substitute signal for the emission signal with the measurement signals of the further sensors. During the operation of the exhaust gas purification system, such a calculation model can furthermore be adaptively adapted.

Furthermore, for the emission signal and at least some process parameters that describe the process state, comparison data can be determined by means of computational models, for example likewise by a prediction method using a regression model. The reliability of the output emission state and of the exhaust gas purification system as a whole can thereby be improved since an early recognition of malfunctions is again possible based on the comparison data.

The electronic processing unit can determine an anomaly of the emission signal when the emission signal does not fulfill a predetermined validity criterion or a combination of predetermined validity criteria. This can be the case if the emission sensor fails or systematic measurement errors occur, such as a drift or jumps. Furthermore, the emission signal lies above the predetermined validity range if, for example, a scrubber of the exhaust gas purification system of a ship is not functioning correctly and the quantity of emitted emissions exceeds a predefined limit value.

In accordance with another embodiment, the electronic processing unit can determine a number of valid process parameters that can be determined based on the measurement signals of the further sensors and that thus describe the process state. An anomaly of the process state can only be determined by means of the electronic processing unit when the number of valid process parameters is greater than a predetermined value. Otherwise, the electronic processing unit outputs a specific error message. The number of valid process parameters can, for example, be determined by evaluating the individual signals for each of the further sensors, for example by a comparison with respective validity criteria. Thus, in this embodiment, a minimum number of valid process parameters is required to demonstrate a process state without an anomaly. Furthermore, the minimum number of valid process parameters can be a prerequisite for the determination of the above-described substitute signal for the emission signal. The condition that a sufficient number of valid process parameters have to be determined, in turn, increases the reliability when determining the acceptable emission state of the exhaust gas purification system.

Furthermore, the electronic processing unit can suppress the determination and the output of the emission state when it determines a non-assessable operating state of the exhaust gas purification system based on at least one of the measurement signals of the further sensors. In this case, a specific error message can be output for the non-assessable operating state. The non-assessable operating state can, for example, comprise a state with the scrubber of the exhaust gas purification system of a ship switched off and/or with the ship's engine switched off. Furthermore, the non-assessable operating state can comprise an operating transition, for example, a restart of a previously shutdown scrubber. By recognizing the non-assessable operating state based on the measurement signal of one of the further sensors, an inapplicable emission state for the emission source can be prevented from being output.

In accordance with another embodiment, the system comprises a further emission sensor that acquires a further emission signal that, just like the previously mentioned original emission signal, is assessed by means of the electronic processing unit with respect to the anomaly. In this embodiment, the signals of at least two emission sensors are consequently considered, wherein the assessment with respect to the anomaly of the respective emission signal can take place iteratively. By considering the further emission signal, the reliability of the acceptable emission state of the exhaust gas purification system that is output by the method is further increased. In this embodiment, the compliant emission state of the exhaust gas purification system is namely determined and output when no anomaly of the emission signals is present or (i.e. then) when an anomaly of at least one of the emission signals is present while at the same time no anomaly of the process state is determined or the anomaly of the emission signals satisfies a respective exception condition.

The electronic processing unit can furthermore be configured to perform the above-described prediction method for a substitute signal of the emission signal and/or for comparison data, for example using an algorithm of machine learning that can be implemented by means of a regression model.

Furthermore, the invention relates to a method for monitoring an exhaust gas purification system that is functionally connected to an emission source that is in particular a ship's engine. In accordance with the method, an emission signal is first acquired by means of an emission sensor that indicates emissions of the emission source on the exiting from the exhaust gas purification system. In addition, measurement signals that are each related to the exhaust gas purification system are acquired by a plurality of further sensors. A process state of the exhaust gas purification system is determined based on the measurement signals of the further sensors.

The emission signal and the process state are subsequently assessed with respect to an anomaly in each case. A compliant emission state of the exhaust gas purification system is determined and output either when no anomaly of the emission signal is present or when an anomaly of the emission signal is present while, however, at the same time either no anomaly of the process state is determined or the anomaly of the emission signal satisfies an exception condition.

The system described above consequently comprises the emission sensor, the plurality of further sensors, and the electronic processing unit that together perform the steps of the method. The above statements on the system in accordance with the invention thus also apply to the method in accordance with the invention, in particular with respect to the disclosure, the advantages, and the preferred embodiments.

BRIEF DESCRIPTION OF THE DRAWINGS

The invention will be described in the following by way of example with reference to an advantageous embodiment and to the enclosed Figures. There are shown, schematically in each case.

DETAILED DESCRIPTION

Figure 1:
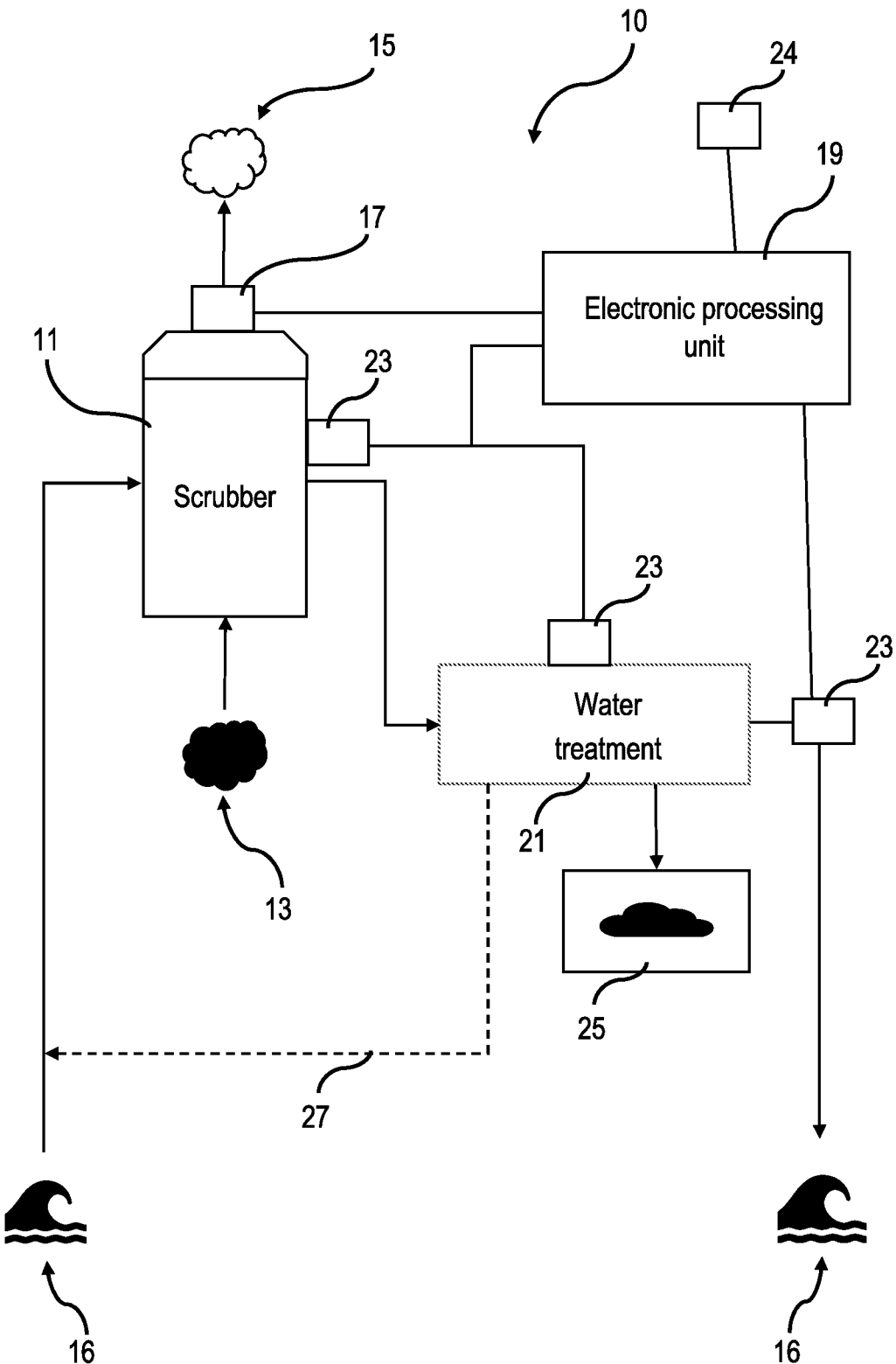
FIG. 1 an exhaust gas purification system of a ship.

FIG. 1 schematically shows an exhaust gas purification system 10 of a ship. The exhaust gas purification system 10 comprises a system in accordance with the invention that is provided for carrying out a method 100 (cf. FIG. 2) for monitoring the emission state of the exhaust gas purification system 10.

The exhaust gas purification system 10 has a scrubber 11 that receives untreated exhaust gas 13 that is discharged by an engine, not shown, of the ship. The untreated exhaust gas 13 is purified in the scrubber 11 and is then discharged from the scrubber 11 into the atmosphere as purified exhaust gas 15. Seawater 16 is conducted into the scrubber 11 to purify the untreated exhaust gas 13. Certain components of the untreated exhaust gas 13, such as sulfur, are washed out of the untreated exhaust gas 13 by means of the seawater 16.

The exhaust gas purification system 10 further comprises an emission sensor that is configured as an exhaust gas sensor 17 and that monitors the composition of the purified exhaust gas 15. This in particular relates to the sulfur content of the purified exhaust gas 15. Furthermore, the exhaust gas purification system 10 comprises an electronic processing unit 19, a device 21 for water treatment and further sensors 23, 24, of which the sensors 23 are in direct contact with the exhaust gas purification system 10, while the sensors 24 are provided for acquiring measurement signals that directly or indirectly influence the exhaust gas purification system 10.

Specifically, the sensors 24 are provided to detect the engine power and further parameters of the ship's engine, not shown. In addition, the sensors 24 comprise those sensors that indicate the speed and the acceleration and further operational variables of the ship. The rotational speed of the ship's engine and the acceleration of the ship are, for example, indirect indicators of the quantity of the untreated exhaust gas 13 that is received by the scrubber 11.

The device 21 for water treatment receives the washing water that was previously conducted through the scrubber 11. The device 21 for water treatment is connected to a sludge tank 25 that receives substances that are filtered out by the device 21 for water treatment from the washing water which the device 21 for water treatment receives from the scrubber 11. Further details of such a device 21 for water treatment that is used in an exhaust gas purification system 10 for ships are known in the prior art and will not be described further below.

The emission or exhaust gas sensor 17 and the further sensors 23, 24 are communicatively coupled to the electronic processing unit 19. The electronic processing unit 19 thus receives an emission signal of the emission or exhaust gas sensor 17 and measurement signals of the further sensors 23, 24. The sensors 23, which are in direct contact with the exhaust gas purification system 10, measure operating parameters of the scrubber 11, such as its temperature and/or internal pressure, and operating parameters of the device 21 for water treatment, such as its temperature, water flow rate, etc.

Furthermore, further ones of the sensors 23 are provided for detecting the condition of the washing water after it exits from the device 21 for water treatment and is ultimately returned to the seawater 16 again. The condition of the washing water can, for example, be detected by its turbidity and/or its acidity or pH value so that a corresponding measurement signal can be derived based on this condition.

The exhaust gas purification system 10 optionally has a return 27 for purified washing water that is returned to the scrubber 11 again by the device 21 for water treatment. In this case, the exhaust gas purification system 10 has a closed loop for the washing water ("closed-loop scrubber"). Alternatively, the exhaust gas purification system 10 does not have the return 27 for the washing water ("open-loop scrubber").

As an alternative to the scrubber 11 that uses seawater 16 or washing water, the exhaust gas purification system 10 can have a dry scrubber or a Denox scrubber. The dry scrubber uses a lime granule instead of the washing water, while the term "Denox" refers to the removal of nitrogen oxides (NOx) from the exhaust gas 13 of the ship's engine. In such a Denox scrubber, the removal of nitrogen oxides can take place in a similar manner as for exhaust gases from motor vehicles that use a catalytic converter.

A plurality of different substances can usually be removed from the exhaust gas 13 of the ship's engine by means of the scrubber 11. For example, the scrubber 11 of FIG. 1, which uses the seawater 16, and the dry scrubbers are indeed primarily provided for removing sulfur, but they are also suitable for soot and nitrogen oxides. Conversely, depending on its design, a Denox scrubber can remove further substances from the exhaust gas, for example sulfur and soot, in addition to nitrogen oxides.

In the case of dry and Denox scrubbers, the further sensors 23 can likewise be directly connected to the respective scrubber to detect operating parameters of the scrubber such as its temperature and/or internal pressure and/or a condition of a respective medium for purifying the exhaust gas 13.

During operation, ships have to be able to demonstrate compliance with required emission limit values. In known exhaust gas purification systems, this is in particular problematic, or even no longer possible, when a failure or an anomaly of an emission sensor, such as the exhaust gas sensor 17 of FIG. 1, is present. In such a case, a manual documentation of the emissions and a subsequent assessment by a skilled person often have to be performed. However, this is often associated with increased costs or is not feasible so that a ship's voyage has to be interrupted and the next port of call has to be made in order to carry out suitable repairs to the exhaust gas purification system.

To overcome such difficulties, the system in accordance with the invention and the method in accordance with the invention are provided that, in addition to the emission signal of the exhaust gas sensor 17, use the signals of the further sensors 23, 24 in order, overall, to be able to describe a process state of the exhaust gas purification system 10 and to be able to prove that the exhaust gas purification system 10 operates correctly even in the event of a failure or an anomaly of the exhaust gas sensor 17 and emits emissions in the form of the purified exhaust gas 15 that complies with the required limit values.

Figure 2:
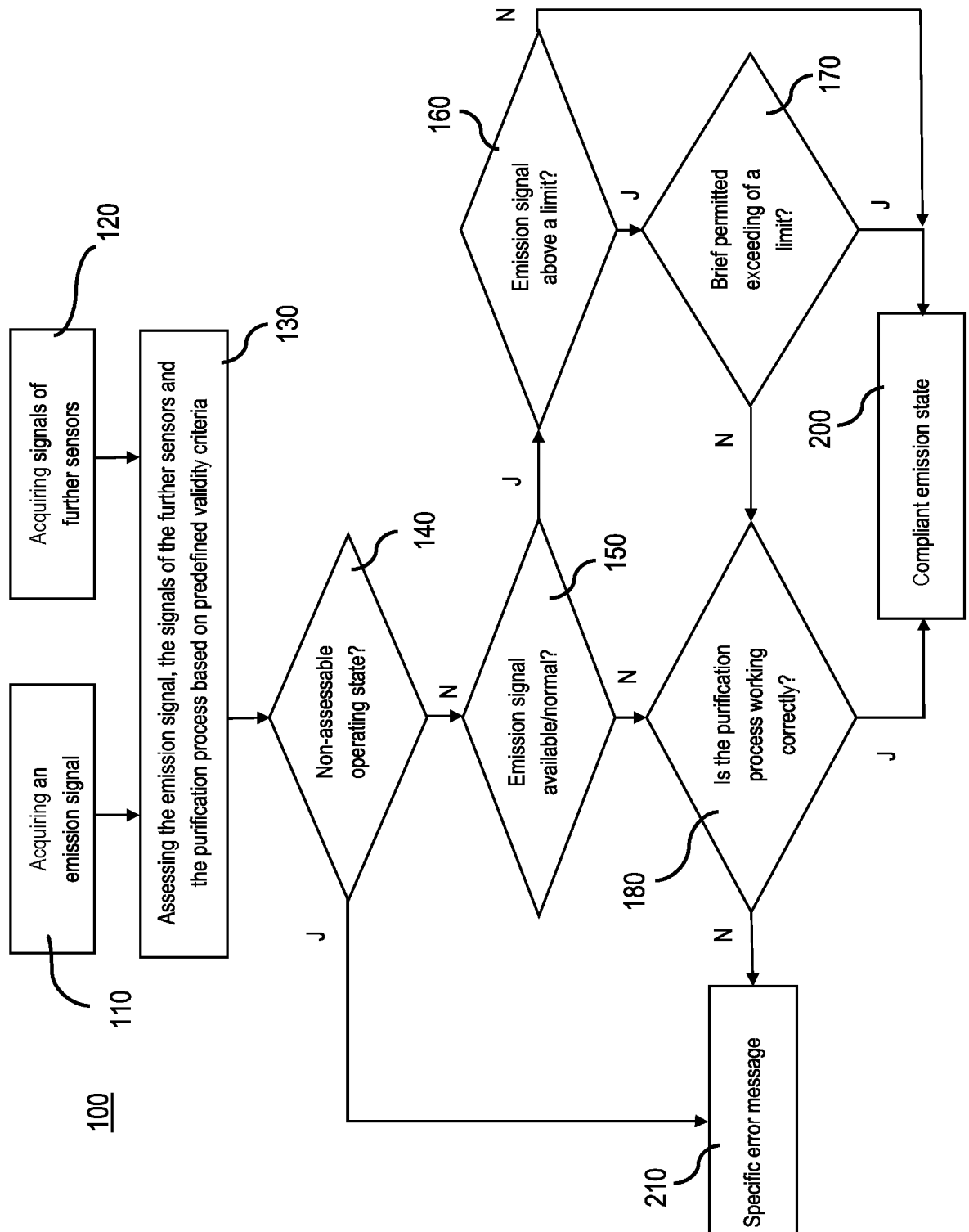
FIG. 2 a flow diagram of a method for monitoring the emission state of the exhaust gas purification system of FIG. 1.

FIG. 2 schematically shows a method 100 of operating the exhaust gas purification system 10 shown in FIG. 1. In step 110, an emission signal of the emission or exhaust gas sensor 17 is acquired, while measurement signals of the further sensors 23, 24 are acquired in step 120. The emission signal indicates the concentration of emissions that exit from the exhaust gas purification system 10, i.e. the emission content of the purified exhaust gas 15, while the measurement signals of the further sensors 23, 24 are directly or indirectly related to the exhaust gas purification system 10, as explained above. The emissions are, for example, specified as a $SO_2$ concentration and/or a $CO_2$ concentration in the exhaust gas in ppm or percentage by volume.

In step 130, the emission signal and the signals of the further sensors are assessed. In detail, signals of the sensors 17, 23, 24 are compared with respective validity criteria. Furthermore, the measurement signals of the further sensors represent process parameters or they enable the determination of further process parameters of the exhaust gas purification system 10 in order, overall, to describe a process state of the exhaust gas purification system 10. For example, information about the power of the ship's engine and the acceleration of the ship can be used to estimate, by means of a model, the quantity of the untreated exhaust gas 13 that will be absorbed by the scrubber 11. Furthermore, in step 130, it is determined whether an anomaly of the emission signal and/or of the process state is present to be able to perform the subsequent steps 140 to 180 in which decisions are made regarding the operation of the exhaust gas purification system 10. The steps 140 to 180 ultimately result in either, at 200, an output of a compliant emission state, which indicates the correct functionality of the exhaust gas purification system 10 within legally prescribed limit values, or, at 210, a specific error message.

At 140, it is determined, based on the process parameters that are based on the measurement signals of the further sensors 23, 24, whether a non-assessable operating state of the exhaust gas purification system 10 is present. Such a non-assessable operating state comprises, for example, that the scrubber 11 is currently switched off or is in an operating transition with a restart. If a non-assessable operating state is present, a corresponding error message is output at 210.

However, if an operating state that can be assessed is present at 140, it is determined in step 150 whether the emission signal of the exhaust gas sensor 17 satisfies a predefined validity criterion. In other words, it is checked at 150 whether an anomaly of the emission or exhaust gas sensor 17 per se is present. Such an anomaly is present when the emission or exhaust gas sensor 17 has failed or when unexpected drifts or jumps occur in the emission signal.

If it is determined at 150 that the emission signal is available and valid, i.e. that the emission sensor has not failed and that plausible values for the emission signal are present, it is determined at 160 whether the emission signal is above a predefined limit value or limit that is specified by law, for example. If the quantity of the emissions detected by means of the exhaust gas sensor 17 is below the limit value, it is output at 200 that a compliant emission state is currently present. If the emission signal is above the predefined limit value, it is determined at 170 whether a brief permitted exceeding of a limit is present.

A brief exceeding of a limit is, for example, permitted for the emission signal if an acceleration of the ship takes place for a certain time period, said acceleration being associated with an increased performance of the ship's engine and thus with an increased quantity of the untreated exhaust gas 13. The presence of a brief, permitted exceeding of a limit can therefore be determined, for example, by means of an acceleration sensor that is one of the sensors 24 (cf. FIG. 1). However, the maximum time period of a permitted exceeding of a limit is currently not specified in detail by the legislators. However, it is to be expected that such a maximum time period is in the range of minutes and is significantly shorter than one hour. If a brief permitted exceeding of a limit is determined at 170, a compliant emission state is again output at 200.

However, if either a missing or an invalid emission signal is determined at 150 or if it is determined at 170 that a brief permitted exceeding of a limit is not present, it is checked at 180 based on the process parameters or the measurement signals of the further sensors 23, 24 whether the process is permitted or is working correctly. First, it is determined whether a sufficient number of valid process parameters are available to be able to assess the emission state. Specifically, each of the further sensors 23, 24 is checked with respect to an anomaly, wherein it is determined whether the respective further sensor 23, 24 has failed, and if this is not the case, whether the measurement signal of the respective further sensor 23, 24 is plausible. If a sufficient number of valid process parameters can be determined based on the measurement signals of the further sensors 23, 24, it is then determined whether the measurement signals of the sensors 23, 24 or the process parameters determined based on them each fulfill predetermined validity criteria that correspond to a compliant emission state. If this is also the case, it is assumed at 180 that the process is working correctly. A correctly working process, for example, comprises that the pH value of the washing water that exits from the water treatment 21 lies between predetermined limit values.

An emission quantity that exits from the exhaust gas purification system 10 and e.g. comprises the sulfur content in the purified exhaust gas 15 can further be estimated based on the process parameters using a model. This estimated emission quantity thus represents a substitute value for the emission signal that is unavailable or unusable due to an anomaly of the emission or exhaust gas sensor 17. If the estimated emission quantity is below the legal limit value described above, a compliant emission state is subsequently output again at 200. However, if it is determined at 180 that the purification process of the scrubber 11 is not working correctly, a specific error message is output at 210.

As explained above, the specific error message at 210 comprises that either a non-assessable operating state is present or that the purification process in the scrubber 11 is not working correctly. At 210, the specific error message further comprises either a reference to the possible cause of the non-assessable operating state or an indication of which measurement signal of the sensors 17, 23, 24 does not fulfill a corresponding validity criterion. A malfunction of one of the sensors 17, 23, 24 can thereby be recognized and corrected at an early stage.

Overall, the assessment of the emission signal and the signals of the further sensors 23, 24 at 130 makes it possible to determine in the steps 140 to 180 whether an anomaly of the emission signal or of the emission sensor 17 is present and/or an anomaly of a process state of the exhaust gas purification system 10, which is based on the measurement signals of the further sensors 23, 24, is present. It is thereby possible to determine an acceptable emission state of the exhaust gas purification system 10 even when an anomaly or a failure of the emission or exhaust gas sensor 17 is present. The correct operation of the exhaust gas purification system 10 can consequently also be proven and documented in such a case. Thus, the time period during which a correct function of the exhaust gas purification system can be proven can be maximized.

If the exhaust gas purification system 10 continues to operate correctly in the event of an anomaly of the emission or exhaust gas sensor 17 and its emission levels are below predefined limit values, the operation of the exhaust gas purification system 10 and thus of the entire ship can be continued without interruption by executing the method 100 when the compliant emission state is determined (cf. step 200). Undesirable operating interruptions, for example during a ship's voyage, can thereby be avoided as long as the process state permits the determination of the acceptable emission state based on the measurement signals of the further sensors 23, 34.

REFERENCE NUMERAL LIST 10 exhaust gas purification system
11 scrubber
13 untreated exhaust gas
15 purified exhaust gas
16 seawater
17 exhaust gas sensor
19 electronic processing unit
21 device for water treatment
23 further sensors of the exhaust gas purification system
24 further sensors of the ship
25 sludge tank
27 washing water return
100 method
110-210 method steps

The invention claimed is:

1. A system for monitoring an exhaust gas purification system that is functionally connected to a ship's engine and that includes a scrubber for purifying exhaust gas of the ship's engine by using washing water and a device for treating the water that is conducted through the scrubber, wherein the system comprises:
an emission sensor that acquires an emission signal that indicates emissions of the ship's engine exiting from the exhaust gas purification system,
a plurality of further sensors that output respective measurement signals related to the exhaust gas purification system, wherein the plurality of further sensors comprise a sensor that indicates the condition of the water after the treatment and before the return to the sea or body of water, and sensors that are installed at or in components of a ship and that define the exhaust gas quantity being received from the exhaust gas purification system, and
an electronic processing unit that is configured:
to determine a process state of the exhaust gas purification system based on the measurement signals of the plurality of further sensors,
to assess the emission signal and the process state with respect to an anomaly in each case,
to determine and to output a compliant emission state, which indicates a correct functionality of the exhaust gas purification system, when no anomaly of the emission signal is present and when an anomaly of the emission signal is present while at the same time no anomaly of the process state is present or the anomaly of the emission signal satisfies an exception condition,
wherein the electronic processing unit calculates a substitute signal for the emission signal based on the measurement signals of the plurality of further sensors when an anomaly of the emission signal is present and no anomaly of the process state is present,
and wherein the electronic processing unit outputs a specific error message when an anomaly of the process state is present and when the anomaly of the emission signal does not satisfy the exception condition.

2. The system in accordance with claim 1, wherein the exception condition comprises that the emission signal deviates for less than a predetermined time period from a normal state that is defined by a validity criterion for the emission signal acquired by the emission sensor.

3. The system in accordance with claim 1, wherein the electronic processing unit determines the compliant emission state based on the emission signal when no anomaly of the emission signal is present and determines the compliant emission state based on the substitute signal when an anomaly of the emission signal is present and no anomaly of the process state is present.

4. The system in accordance claim 1, wherein the electronic processing unit determines an anomaly of the emission signal when the emission signal does not fulfill a predetermined validity criterion or a combination of predetermined validity criteria.

5. The system in accordance with claim 1, wherein the electronic processing unit determines a number of valid process parameters that can be determined based on the measurement signals of the plurality of further sensors and only assesses the process state with respect to an anomaly when the number of valid process parameters is greater than a predetermined value, and otherwise outputs a specific error message.

6. The system in accordance with claim 1, wherein the electronic processing unit suppresses the determination and the output of the emission state when the electronic processing unit determines a non-assessable operating state of the exhaust gas purification system based on at least one of the measurement signals of the plurality of further sensors, and outputs a specific error message for the non-assessable operating state.

7. The system in accordance with claim 1, that further comprises a further emission sensor that acquires a further emission signal, and
wherein the electronic processing unit is further configured:
to assess the further emission signal with respect to an anomaly and
to determine and to output a compliant emission state of the exhaust gas purification system when no anomaly of the emission signals is present or when an anomaly of at least one of the emission signals is present while at a same time no anomaly of the process state is determined or the anomaly of the emission signals satisfies a respective exception condition.

8. A method for monitoring an exhaust gas purification system that is functionally connected to a ship's engine and that includes a scrubber for purifying exhaust gas of the ship's engine by using washing water and a device for treating the water that is conducted through the scrubber, the method comprising:
acquiring an emission signal is acquired by means of an emission sensor, wherein the emission signal indicates emissions of the ship's engine on the exiting from the exhaust gas purification system,
acquiring measurement signals that are each related to the exhaust gas purification system are acquired by a plurality of further sensors,
wherein the plurality of further sensors comprise a sensor that indicates the condition of the water after the treatment and before the return to the sea or body of water, and sensors that are installed at or in components of a ship and that define the exhaust gas quantity being received from the exhaust gas purification system, determining a process state of the exhaust gas purification system based on the measurement signals of the plurality of further sensors, assessing the emission signal and the process state with respect to an anomaly in each case, determining and outputting a compliant emission state that indicates a correct functionality of the exhaust gas purification system when no anomaly of the emission signal is present and when an anomaly of the emission signal is present while at the same time no anomaly of the process state is determined or the anomaly of the emission signal satisfies an exception condition, and calculating a substitute signal for the emission signal based on the measurement signals of the plurality of further sensors when an anomaly of the emission signal is present and no anomaly of the process state is present, and outputting a specific error message when an anomaly of the process state is present and when the anomaly of the emission signal does not satisfy the exception condition.

9. A system for monitoring an exhaust gas purification system that is functionally connected to a ship's engine and that includes a scrubber for purifying exhaust gas of the ship's engine by using washing water and a device for treating the water that is conducted through the scrubber, wherein the system comprises:

an emission sensor that acquires an emission signal that indicates emissions of the ship's engine exiting from the exhaust gas purification system, a plurality of further sensors that output respective measurement signals related to the exhaust gas purification system, wherein the plurality of further sensors comprise a sensor that indicates the condition of the water after the treatment and before the return to the sea or body of water, and sensors that are installed at or in components of a ship and that define the exhaust gas quantity being received from the exhaust gas purification system, and an electronic processing unit that is configured:

to determine a process state of the exhaust gas purification system based on the measurement signals of the plurality of further sensors, to assess the emission signal and the process state with respect to an anomaly in each case, to determine and to output a compliant emission state, which indicates a correct functionality of the exhaust gas purification system, when no anomaly of the emission signal is present and when an anomaly of the emission signal is present while at the same time no anomaly of the process state is present or the anomaly of the emission signal satisfies an exception condition, wherein the electronic processing unit determines a number of valid process parameters that can be determined based on the measurement signals of the plurality of further sensors and only assesses the process state with respect to an anomaly when the number of valid process parameters is greater than a predetermined value, and otherwise outputs a specific error message.

* * * * *